United States Patent
Yamaoka et al.

(10) Patent No.: US 7,124,714 B2
(45) Date of Patent: Oct. 24, 2006

(54) FUEL SUPPLY APPARATUS USING LOW BOILING POINT FUEL AND ITS CONTROL METHOD

(75) Inventors: Shiro Yamaoka, Hitachi (JP); Minoru Oosuga, Hitachinaka (JP); Kinya Nakatsu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/383,544

(22) Filed: Mar. 10, 2003

(65) Prior Publication Data

US 2003/0230249 A1      Dec. 18, 2003

(30) Foreign Application Priority Data

Jun. 14, 2002    (JP)    ............... 2002-173563

(51) Int. Cl.
*F02B 75/12*    (2006.01)

(52) U.S. Cl. .................. 123/1 A; 123/495; 123/541; 123/457; 123/527; 137/264; 220/723

(58) Field of Classification Search ............... 123/1 A, 123/541, 557, 495, 457, 529, 198 D, 527; 220/586, 723; 137/264
See application file for complete search history.

(56) References Cited

U.S. PATENT DOCUMENTS

| | | | | |
|---|---|---|---|---|
| 3,747,800 A | * | 7/1973 | Viland | .................. 220/723 |
| 4,101,045 A | * | 7/1978 | Roberts et al. | ......... 220/560.12 |
| 5,033,444 A | * | 7/1991 | Kaufman et al. | ............ 123/527 |
| 6,067,972 A | * | 5/2000 | Jaasma | ........................ 123/549 |
| 6,418,962 B1 | * | 7/2002 | Wozniak et al. | ............ 137/266 |
| 6,460,721 B1 | * | 10/2002 | Bowen et al. | ............... 220/586 |

FOREIGN PATENT DOCUMENTS

JP    2001-115916    4/2001

\* cited by examiner

*Primary Examiner*—Tony M. Argenbright
*Assistant Examiner*—Katrina B. Harris
(74) *Attorney, Agent, or Firm*—Crowell & Moring LLP

(57) ABSTRACT

A fuel supply apparatus reduces the fuel vaporization and leakage. The positions of vaporization and leakage and their amount in the fuel tank and the fuel pipe are detected when using a low boiling point fuel having a vapor phase in the normal temperatures and atmospheric pressures, and the fuel state is controlled based on those detected values. By providing another container made of elastomatic material having an expandable mechanical characteristic inside the fuel storing container, the low boiling point fuel is stored in the separate container. A flow rate controlling apparatus is provided for heating or cooling the fuel pipe leading the low boiling point fuel stored in the fuel storing container to the engine. A flow rate controlling apparatus is provided for adjusting the flow rate of the fuel in the fuel pipe for leading the low boiling point fuel stored in the fuel storing container to the engine.

7 Claims, 9 Drawing Sheets

(a) WHEN NORMAL STATE (b) WHEN VAPORIZED FUEL EXISTS (c) WHEN LEAKAGE OCCURS (a) WHEN NORMAL STATE (b) WHEN VAPORIZED FUEL EXISTS (c) WHEN LEAKAGE OCCURS

FUEL SUPPLY APPARATUS USING LOW BOILING POINT FUEL AND ITS CONTROL METHOD

BACKGROUND OF THE INVENTION

The present invention relates to a fuel supply apparatus for low boiling point fuel vaporized at normal temperatures and under atmospheric pressures, and specifically to preventing vaporization and leakage of the fuel.

From the point of view regarding to the terrestrial environment problems typified by global warming and the energy problems, low carbon fuels such as natural gas (CNG, LNG), liquefied petroleum gas (LPG) and dimethyl ether (DME) are being introduced for the engines such as automobile internal combustion engine. As the number of carbon atoms in the individual fuel molecule is less than that of the gasoline and the petroleum, and their heat release value per a single carbon atom is higher than that of the gasoline and the petroleum, the umber of carbon atoms for an identical heat release value becomes reduced in those fuels. This means that the amount of emitted gaseous $CO_2$ from the engine can be reduced, which leads advantageously to preventing the global warming and to the energy saving. An application of DME is proved to be valid for an alternative fuel for the diesel engines because it is proved that there is no soot generated. As those low carbon fuels have low boiling point and stay in a gaseous phase at normal temperatures and under an atmospheric pressure. For example, in case of applying those fuels into diesel engines, it is required to maintain its liquid phase by pressurizing or cooling the fuel properly and to inject the fuel into the combustion chamber by using a high pressure pump. In this operation, there are such problems as defect in the fuel feed operation and fuel leakage outside the fuel supply system due to the fuel vaporization in the fuel pipe extended from the fuel tank because the fuel has a low boiling point. As for the technologies solving those problems, there disclosed a technology found in Japanese Patent Laid-Open Number 2001-115916 in which the feed pressure in the feed pump installed in the fuel tank is controlled in responsive to the map prepared based on the DME vapor pressure chart and the detected value of the fuel pressure.

There still remain such problems in the prior art as described below.

As the vapor pressure chart of the fuel is determined uniquely by the fuel temperature, the feed pressure of the fuel pump is dominated by the fuel temperature at the sensing point of the temperature sensor. This means that this technology can not solve the fuel vaporization or leakage in case that there exists a local heat spot in the fuel pipe.

SUMMARY OF THE INVENTION

On this subject, an object of the present invention is to provide a fuel supply apparatus and its control method enabling to reduce or prevent the fuel vaporization and leakage by means that the fuel state in the fuel tank and the fuel pipe (for example, the positions of vaporization and leakage and their amount) is detected properly in case of using low boiling point fuels having a vapor phase in the normal temperatures and atmospheric pressures, and the fuel state is controlled based on those detected values.

In order to attain the above object, in the present invention, an additional elasticated container made of elastomeric material is installed inside the fuel storing container, and the low boiling point fuel is stored in this additional container.

In another invention, a temperature control apparatus is provided for heating or cooling the fuel pipe supplying the low boiling point fuel stored in the fuel storing container to the engine.

In another invention, a flow rate control apparatus is provided for regulating the fuel flow in the fuel pipe supplying the low boiling point fuel stored in the fuel storing container to the engine.

In another invention, a adjusting apparatus is provided for regulating at least either of the fuel pressure or the fuel temperature in responsive to the output signal from the control apparatus generating an electric signal in responsive to at least either of the fuel leakage volume or the fuel vaporization state.

In another invention, a fuel flow rate adjusting apparatus is provided for adjusting the flow rate of fuel in the fuel pipe only when the relation between the fuel pressure inside the fuel pipe supplying the fuel from the fuel storing container to the engine and the fuel temperature in side the fuel pipe supplying the fuel from the fuel storing container to the engine reaches a specified condition.

DETAILED DESCRIPTION OF THE PREFERRED EMBODIMENTS

Figure 1:
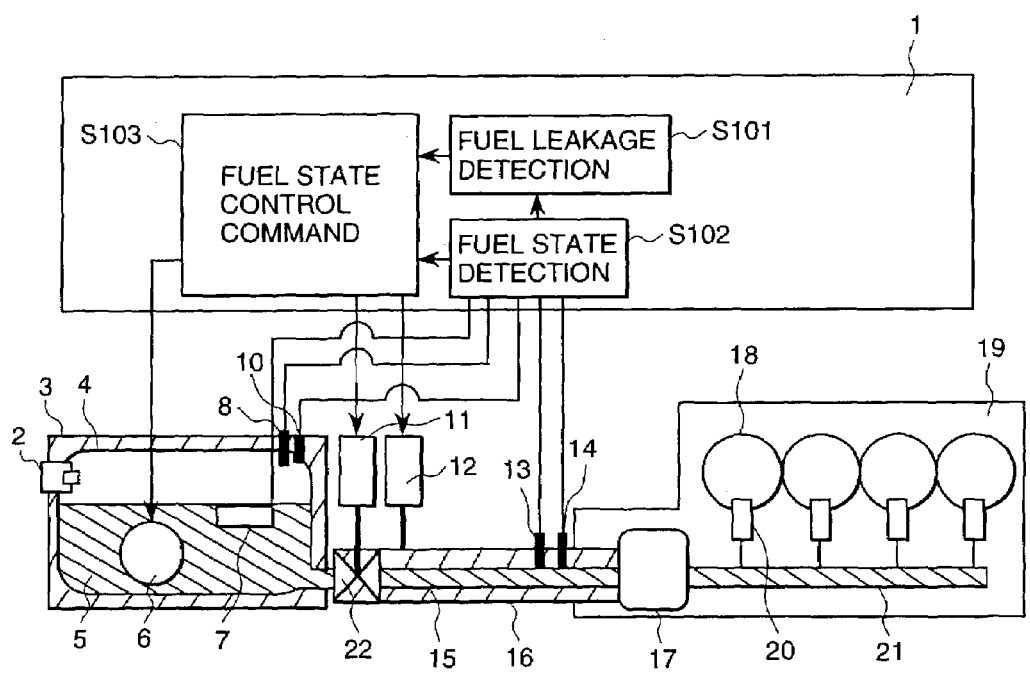
FIG. 1 is a structure of the fuel supply apparatus and its control diagram in the first embodiment of the present invention.

The basic configuration of the embodiment for implementing the present invention is described as below.

In the fuel supply apparatus for supplying the low boiling point fuel having a vapor phase at the normal temperatures and the atmospheric pressures, what are provided are a fuel storing means for storing the low boiling point fuel; a fuel conveying means for conveying the low boiling point fuel from the fuel storing means; a fuel pipe for leading the low boiling point fuel to be conveyed from the fuel storing means; a fuel leakage protecting means for preventing the leakage of the low boiling point fuel in the fuel storing means or in the fuel pipe; a fuel leakage detecting means for detecting the fuel leakage in the fuel storing means or in the fuel pipe; a fuel state detecting means for detecting the fuel state in the fuel storing means or in the fuel pipe; and a fuel state controlling means for controlling the fuel state in the fuel storing means or in the fuel pipe, in which at least one of the states in the fuel storing means, the fuel conveying means, the fuel pipe and the fuel leakage protecting means is controlled by the fuel state controlling means in responsive to the detection result by the fuel state detecting means and said fuel leakage detecting means.

More specifically and preferably, in the above described fuel supply apparatus, the fuel state controlling means controls at least one of the temperature, the pressure and the shape in the fuel storing means, the fuel pipe and the fuel leakage protecting means in responsive to the detection result by the fuel state detecting means and the fuel leakage detecting means.

In addition, the following configurations are preferably provided.

In the fuel supplying apparatus, the above described fuel state controlling means preferably controls the voltage of the fuel conveying means in responsive to the detection result by the fuel state detecting means and the fuel leakage detecting means.

In the above described fuel supplying apparatus, the fuel leakage protecting means is preferably provided inside the fuel storing means, and the fuel leakage protecting means is made of elastomatic material having an expandable mechanical characteristic and stores the low boiling point fuel inside this elasticated container.

The above described fuel leakage protecting means adjusts preferably the internal volume of the elasticated container in responsive to the detection result by the fuel state detecting means and the fuel leakage detecting means.

The above described fuel supplying apparatus preferably has a fuel state controlling means outside the fuel pipe.

The fuel state controlling means preferably has a adjusting device attached to the fuel pipe.

The fuel state controlling means is defined as refrigeration medium passing through the pipe attached to the fuel pipe and its temperature is controlled by the temperature-adjusting device.

The refrigeration medium is preferably water, which passes through the pipe attached to the fuel pipe into the radiator for the cooling water.

The fuel leakage detecting means is preferably composed of at least one of a fuel pressure sensor provided in the fuel pipe, a pressure sensor provided in the fuel storing means, a fuel temperature sensor provided at the fuel pipe or the fuel storing means, a fuel remaining sensor for detecting the remaining low boiling point furl in the fuel storing means, a volume detecting sensor for detecting the volume of the elasticated container provided in the fuel storing means and a fuel conveying means, and estimates the fuel leakage amount according to the output signals from the individual sensors and means and their calculation result.

The fuel leakage detecting means is preferably composed of at least one of a fuel pressure sensor provided in the fuel pipe, a pressure sensor provided in the fuel storing means, a fuel temperature sensor provided at the fuel pipe or the fuel storing means, a fuel remaining sensor for detecting the remaining low boiling point furl in the fuel storing means, a volume detecting sensor for detecting the volume of the elasticated container provided in the fuel storing means and a fuel conveying means, and estimates the fuel leakage location according to the output signals from the individual sensors and means and their calculation result.

The operation of the internal combustion engine is preferably terminated in case that the estimated value for the fuel leakage amount is a designated value or larger.

The fuel leakage alarming means is preferably provided for signaling at least one of the alarm sound or the alarm lamp in case that the estimated value for the fuel leakage amount is a designated value or larger.

The fuel leakage location alarming means is preferably provided for reporting the estimated result for the fuel leakage location.

Preferably, in case that at least one means of the fuel storing means for storing the low boiling point fuel; the fuel conveying means for conveying the low boiling point fuel from the fuel storing means to the engine; the fuel pipe for leading the low boiling point fuel to be conveyed from the fuel storing means to the internal combustion engine; the fuel leakage protecting means for preventing the leakage of the low boiling point fuel in the fuel storing means or in the fuel pipe; the fuel leakage detecting means for detecting the fuel leakage in the fuel storing means or in the fuel pipe; the fuel state detecting means for detecting the fuel state in the fuel storing means or in the fuel pipe; and the fuel state controlling means for controlling the fuel state in the fuel storing means or in the fuel pipe is defected, the operation of the internal combustion engine is terminated.

Preferably, in case that at least one means of the fuel storing means for storing the low boiling point fuel; the fuel conveying means for conveying the low boiling point fuel from the fuel storing means to the engine; the fuel pipe for leading the low boiling point fuel to be conveyed from the fuel storing means to the internal combustion engine; the fuel leakage protecting means for preventing the leakage of the low boiling point fuel in the fuel storing means or in the fuel pipe; the fuel leakage detecting means for detecting the fuel leakage in the fuel storing means or in the fuel pipe; the fuel state detecting means for detecting the fuel state in the fuel storing means or in the fuel pipe; and the fuel state controlling means for controlling the fuel state in the fuel storing means or in the fuel pipe is defected, the fuel leakage alarming means is provided for signaling at least one of the alarm sound or the alarm lamp.

Preferably, in case that at least one means of the fuel storing means for storing the low boiling point fuel; the fuel conveying means for conveying the low boiling point fuel from the fuel storing means to the internal combustion engine; the fuel pipe for leading the low boiling point fuel to be conveyed from the fuel storing means to the internal combustion engine; the fuel leakage protecting means for preventing the leakage of the low boiling point fuel in the fuel storing means or in the fuel pipe; the fuel leakage detecting means for detecting the fuel leakage in the fuel storing means or in the fuel pipe; the fuel state detecting means for detecting the fuel state in the fuel storing means or in the fuel pipe; and the fuel state controlling means for controlling the fuel state in the fuel storing means or in the fuel pipe is defected, the fuel system fault location alarming means is provided for reporting which means is fault.

Now, by referring to the figures, the embodiment of the present invention is described in detail.

FIG. 1 illustrates the configuration of the fuel supplying apparatus and its control flow diagram schematically in the first embodiment of the present invention. The configuration of this embodiment is characterized by that the fuel feed pump 6 is used as the fuel conveying means and that the temperature of the fuel pipe 15 can be controlled by the heat insulating material 16 and the temperature adjusting device 12. The component 3 in FIG. 1 is a fuel tank used as the means for storing the fuel 5. The fuel 5 is a low boiling point fuel having a gaseous phase state in the normal temperatures and under the atmospheric pressures, for example, LNG (Liquefied Natural Gas), LPG (Liquefied Petroleum Gas) and DME (Dimethyl Ether). There is an elastometic film 4 inside the fuel tank 3. This elastomatic film 4 of the container has such a material characteristic having an expandable mechanical characteristic, which enables to protect the leakage from the fuel tank 3 because the inside pressure of the tank can be buffered with the elastomatic characteristic of the elastomatic film 4 by means of storing the low boiling point fuel 5 inside the film even if the volume of the low boiling point fuel increases and its inside pressure increases when the low boiling point fuel 5 evaporates. In addition, the fuel tank 3 has the fuel supply port 2, the feed pump 6 for conveying the fuel, the fuel remaining volume sensor 7 for detecting the fuel remaining volume, the pressure sensor 8 for detecting the pressure I inside the fuel tank 3, and the sensor 10 for detecting the expansion and contraction of the elastomatic film 4. The sensor 10 is preferably formed as a distortion sensor, which can detects the expansion and contraction of the elastomatic film 4 in responsive to the changes in the electric resistance in the sensor 10 due to the expansion and contraction of the elastomatic film 4. The component 22 is a magnetic valve, which controls the fuel flow rate between the fuel tank 3 and the fuel pipe 15 by using the magnetic valve controller 11 and can break down the fuel flow between them when the fuel leakage occurs or the fuel supply fails. The control method of those components will be described later. The component 16 is a heat insulating material, which protects the fuel pipe 15 from the heat generated outside and prevents the fuel in the fuel pipe 15 from being vaporized. In case that the fuel pipe 15 is formed preliminary as a heat-insulated member, the heat insulating material 16 is not required. The component 12 is a temperature adjusting device for controlling the temperature of the fuel pipe 15. The component 13 is a fuel pressure sensor and the component 14 is a fuel temperature sensor, which detect the fuel pressure and temperature of the fuel flowing in the fuel pipe 15. The locations of the fuel pressure sensor 13 and the fuel temperature sensor 14 are not defined specifically but it may be preferable that the fuel pressure sensor 13 and the fuel temperature sensor 14 are located relatively in a short distance to each other. The component 19 is an engine, which is preferably configured as an internal combustion engine in which the pump 17 is provided and the fuel with its pressure increased by the pump 17 is directly injected into the combustion chamber 18 through pipe 21 and the injector 20. As this embodiment is characterized as the fuel supplying apparatus for conveying the low boiling point fuel 5 from the fuel tank 3 to the engine 19, the operation mode (whether it is implemented as the internal combustion engine, the external combustion engine or the fuel cell) or the configuration (whether the pump 17 is used or not) of the engine is not defined specifically. Assuming that the engine 19 is an internal combustion engine, this embodiment is further described below. The component 1 is an engine control unit (hereinafter referred to as ECU) for controlling the operation status of the engine 19. In this embodiment, in the fuel tank 3 and the fuel pipe 15, the fuel state (whether it is in a vapor phase or in a liquid phase), the fuel leakage volume and the fuel leakage location are detected or estimated from the values obtained by the above described sensors, and the instructions for controlling the fuel state are calculated and determined. Based on those computational results, by using the feed pump 6, the magnetic valve controller 11 and the temperature adjusting device 12, the fuel state in the fuel tank 3 and the fuel pipe 15 is controlled. The method for controlling the fuel state in this embodiment is described below by referring to FIGS. 2 to 6.

Figure 2:
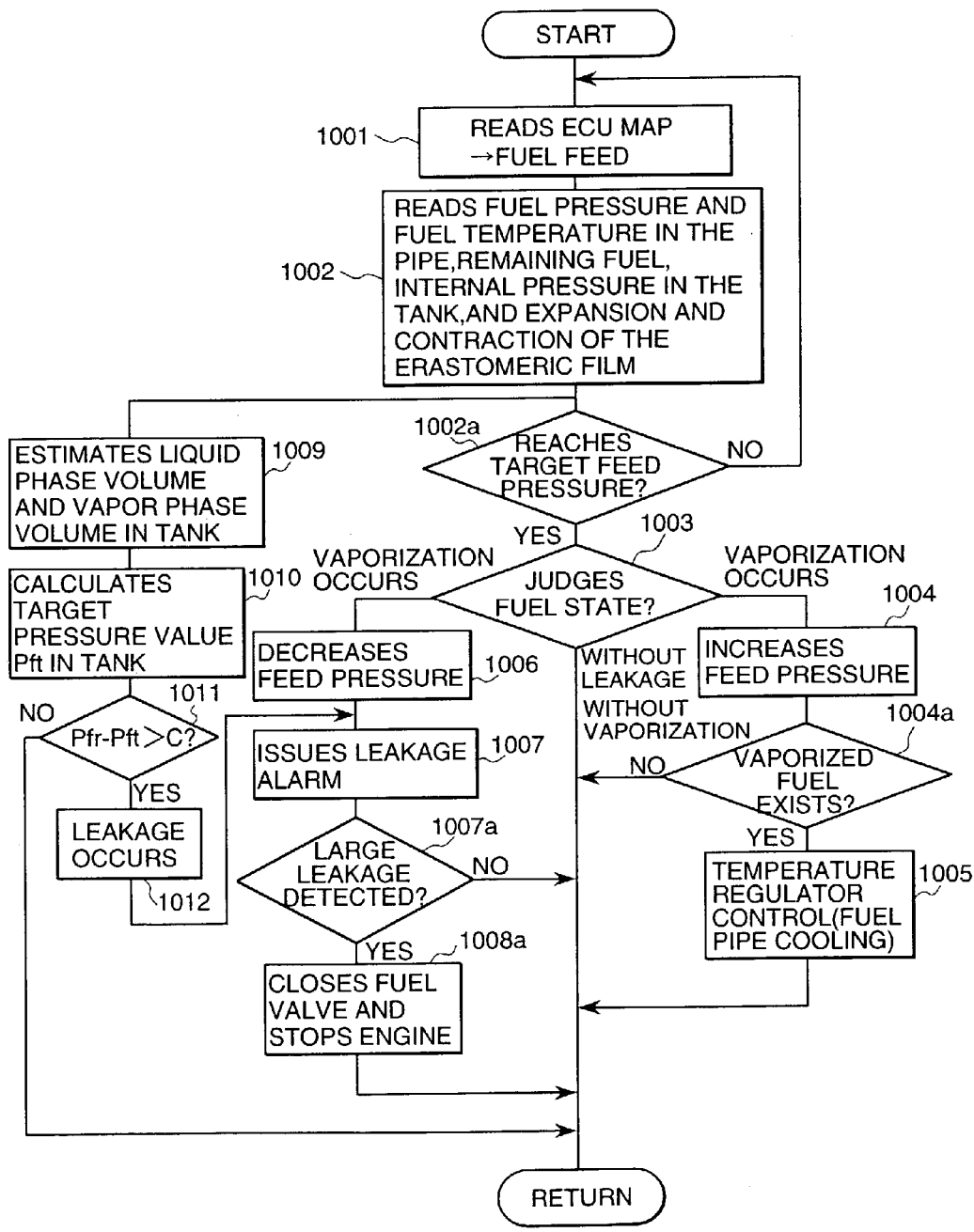
FIG. 2 is a flowchart for controlling the fuel state in the operation of the engine in the first embodiment of the present invention.

FIG. 2 shows an flow chart for controlling the fuel state in the first embodiment of the present invention in which the engine 19 (an internal combustion engine in this embodiment) is in operation. In FIG. 2, when the engine 19 is in operation, the fuel 5 is fed by the feed pump 6 with a designated pressure (Block 1001). This feed pressure is selected from the target feed pressure values predefined in ECU1 in responsive to the operational condition, the ambient air condition and the output value from the fuel temperature sensor 14. Next, the fuel pressure and temperature in the fuel pipe 15 are detected by the fuel pressure sensor 13 and the fuel temperature sensor 14, and the output values from the fuel remaining volume sensor 7, the pressure sensor 8 the elastomatic film expansion sensor 10 are read in as the information on the state inside the fuel tank 4 (Block 1002). At this step, by comparing the target feed pressure value with the output value from the fuel pressure sensor in the fuel pipe 15, the feed back control is performed so that the output value from the feed pump may become the target feed pressure value. Next, the fuel state is judged (Block 1003), and then the target feed pressure is increased when the vaporized fuel exists (Block 1004). In case that there exists a vaporized fuel yet after increasing the target feed pressure, the fuel pipe 15 is made cooled by operating the temperature adjusting device 12 (Block 1005). In case that the fuel leakage is detected in the result of Block 1003, the pressure of the feed pump is decreased (Block 1006), and in case that the engine 19 is loaded in the vehicle, the fixed power generator or the fixed compression refrigerating machine, the warning sound or light is issued to the user of the vehicle (Block 1007). In case that the fuel leakage volume is large or that the fuel leakage volume is a given value or larger even after decreasing the feed pump pressure, the operation of the engine is terminated by shutting down the fuel supply by closing the electromagnetic valve 22 after issuing the warning signal to the user (Block 1008). In case that the engine 19 is used in a vehicle and its system is configured like a hybrid automotive in which the drive system is driven by the motor as well as the engine 19, it is allowed to operate the drive system with the motor while the fuel supply to the engine 19 is suspended. As for the fuel state in the fuel tank 3, the gaseous phase volume and the liquid phase volume in the fuel tank 3 is estimated by the output value, read in at Block 1002, from the fuel remaining volume sensor 7 and the elastomatic film expansion sensor 10 (Block 1009), and the target pressure value Pft in the fuel tank 3 is calculated (Block 1010). Comparing this value, Pft, with the output value Ptf from the pressure sensor 8 (Block 1011), if the difference between two values, Pfr–Pft, is a given value or larger, it is judged that the actual gaseous phase volume is smaller than the estimated gaseous phase volume, that is, the fuel leakage may occur (Block 1012), then Block 1007 is selected next and consecutive control operations are performed. In Block 1007, the fuel leakage locations are warned in association with the locations inside the fuel tank 3 or inside the fuel pipe 15, respectively.

Figure 3:
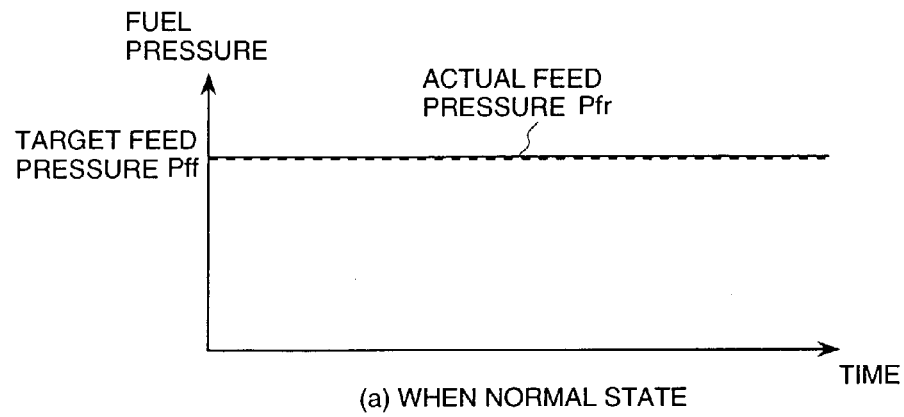
FIG. 3 is a relationship between the target feed pressure value and the output value from the fuel pressure sensor in the first embodiment of the present invention.
Figure 3:
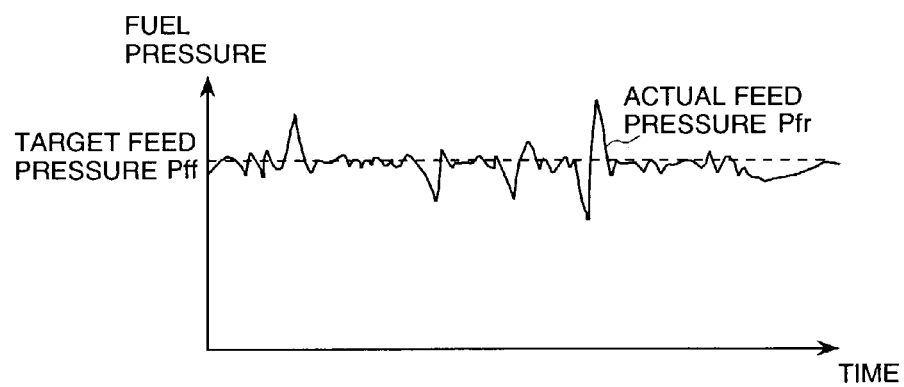
Figure 3:
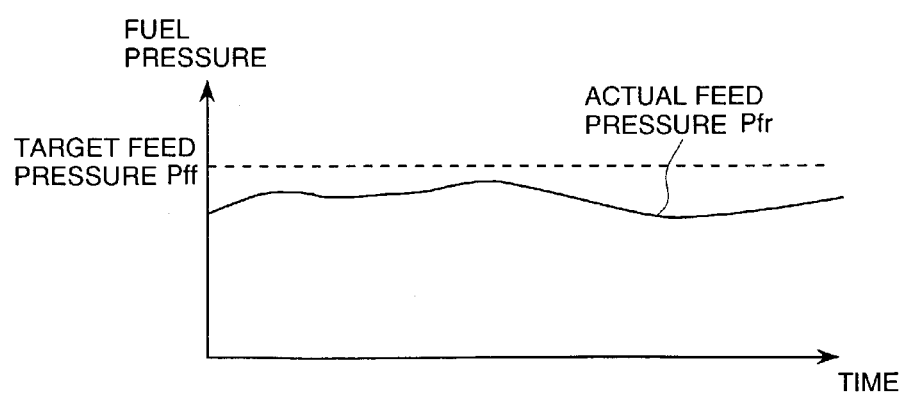

FIG. 3 shows the relationship between the target feed pressure value and the output value from the fuel pressure sensor. As shown in FIG. 3, the output value from the fuel pressure sensor in relation to the target feed pressure value varies for the cases including (a) when normal operation (with nothing peculiar), (b) when vaporized fuels exist in the pipe and (c) when fuel leakage occurs. In case of (a) normal operation, that is, there is no abnormal state found in the fuel supply system, the target feed pressure value becomes almost identical to the actual fuel pressure sensed value, but in contrast, in case of (b) vaporized fuels existing, the actual fuel pressure value changes in the time domain, and in case of (c) fuel leakage, the actual fuel pressure value does not exceed the target feed pressure value. By observing this relationship, it will be appreciated that the fuel state can be judged accurately, and that the influence by the fuel vaporization and the fuel leakage in the fuel pipe 15 can be reduced or removed.

Figure 4:
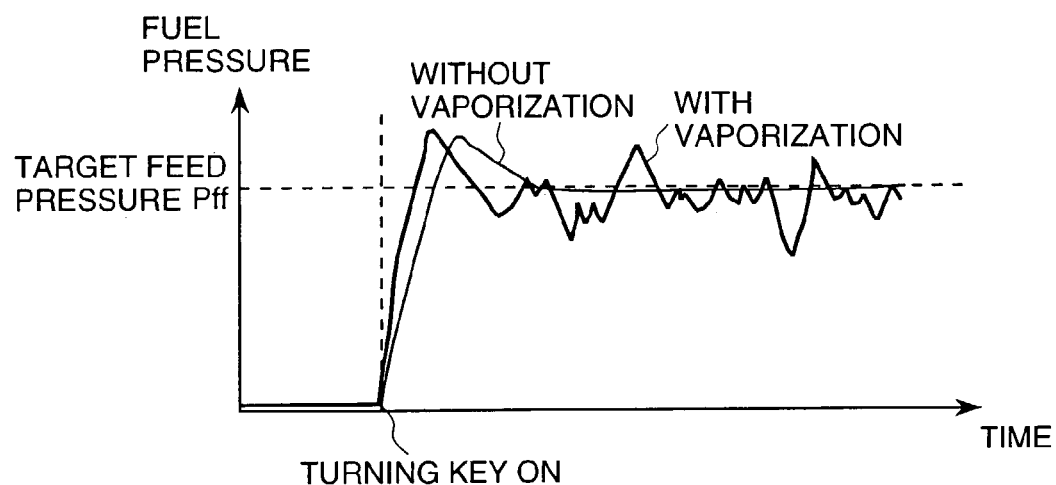
FIG. 4 is a relationship between the target feed pressure value and the output value from the fuel pressure sensor in the start-up operation of the engine in the first embodiment of the present invention.

FIG. 4 shows the relationship between the target feed pressure value and the output value from the fuel pressure when the engine starts. When the key is turned on in order to start the engine 19, the feed pump is operated and the fuel pressure rises up. According to this figure, it is proved that the transient characteristic in the rise-up of the fuel pressure changes dependent of the existence of the vaporized areas in the fuel pipe 15.

Figure 5:
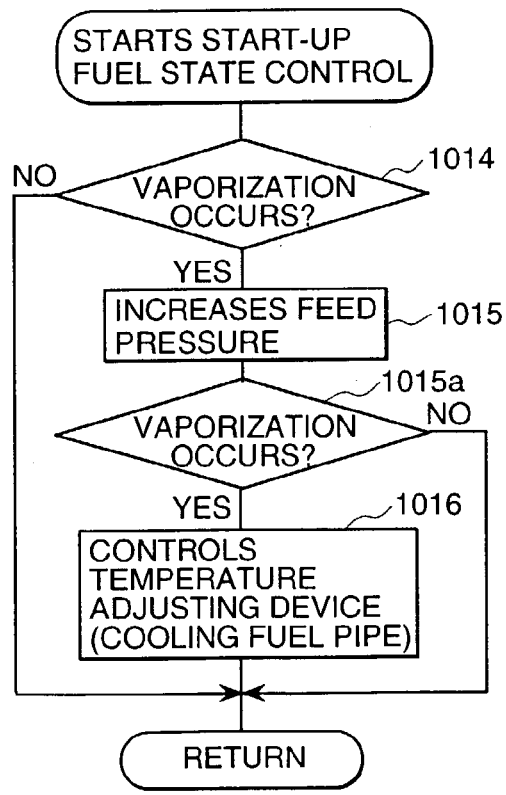
FIG. 5 is a flowchart for controlling the start-up operation in the first embodiment of the present invention.

FIG. 5 shows a control flow chart when the engine starts. If it is judged that the vaporized area exists in the fuel pipe 15 by referring to the transient characteristic in the rise-up of the fuel pressure shown in FIG. 4 (Block 1014), the target feed pressure is increased (Block 1015). In case that the vaporized fuel exists yet after increasing the target feed pressure, the fuel pipe 15 is cooled by operating the temperature adjusting device 12 (Block 1016).

Figure 6A:
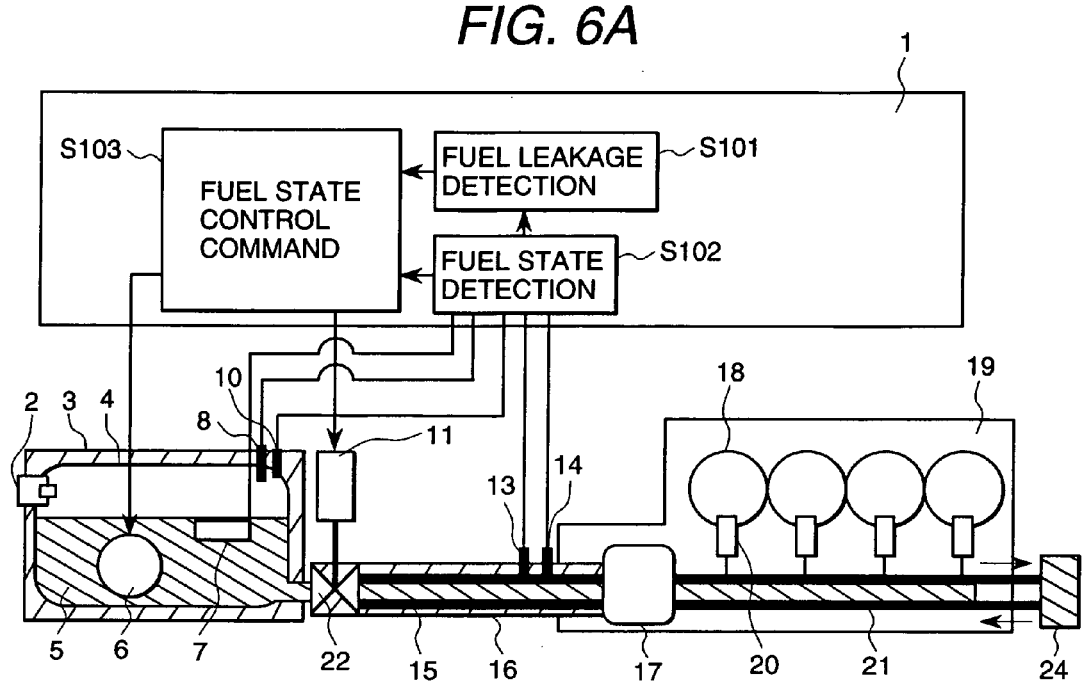
FIGS. 6A, 6B and 6C are configuration examples of the cooling structure of the fuel pipe and the temperature adjusting deice in the fuel supply apparatus of the present invention.
Figure 6B:
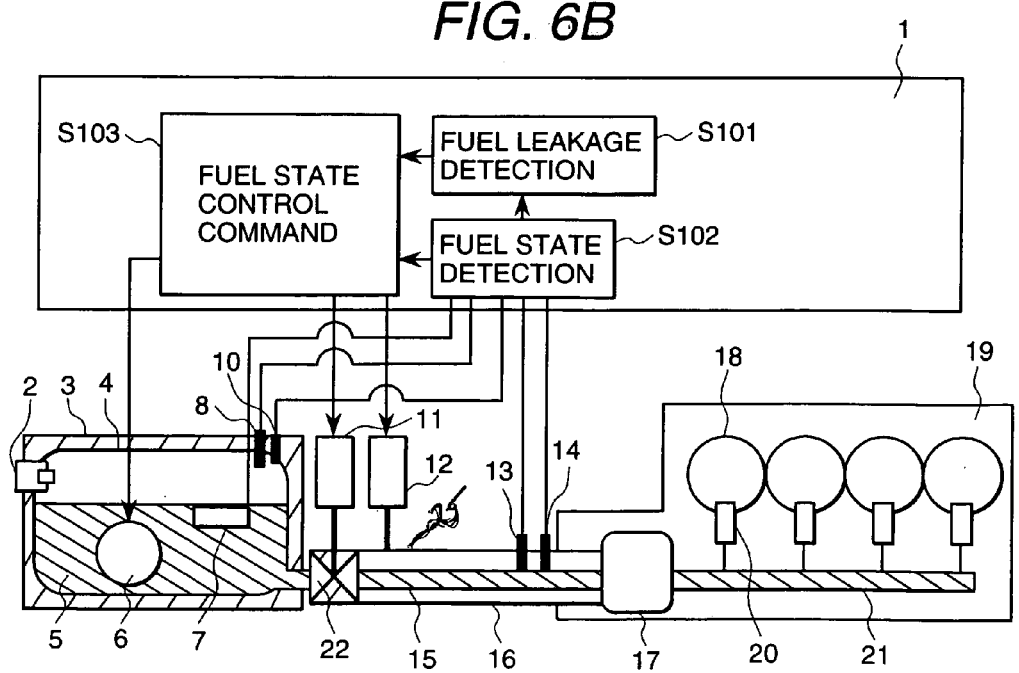
Figure 6C:
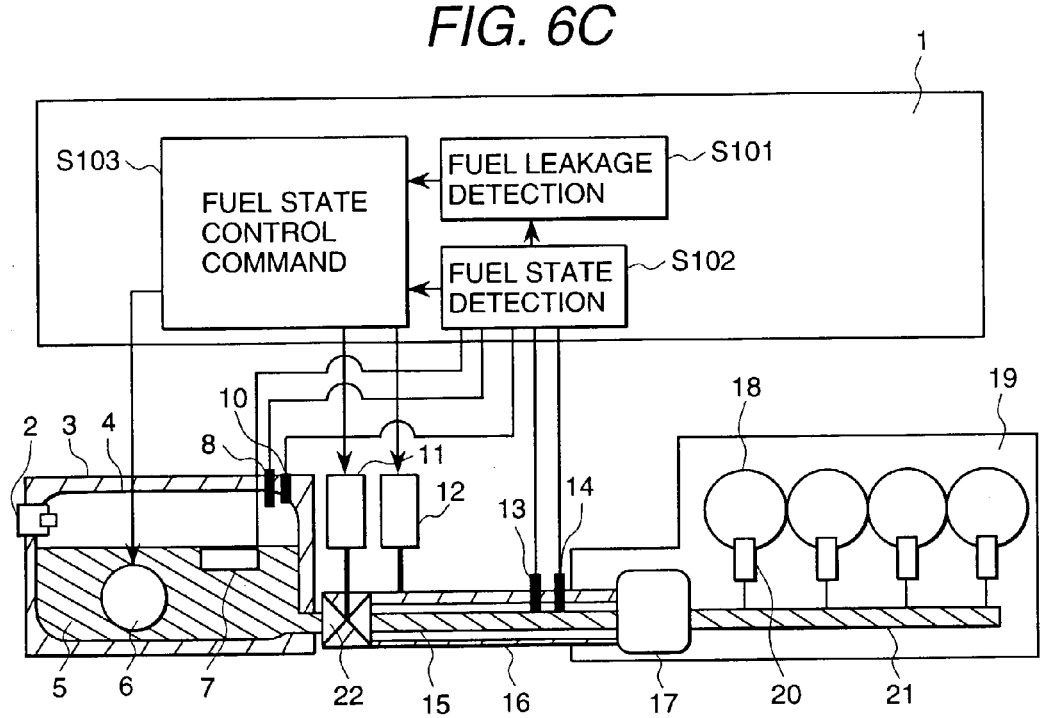

FIGS. 6A, 6B and 6C show examples of the configuration of the cooling structure including the fuel pipe 15 and the temperature adjusting device in the fuel supply apparatus. In the configuration shown in FIG. 6A, a radiator 24 is used as the temperature adjusting device, and the cooled water path is integrated with the fuel pipe 15. Though it is allowed to divert the radiator 24 used for the cooling water in the engine 19, it is preferable that the cooling pipe for the fuel pipe 15 is provided so as to be independent of the cooling pipe for the engine because the temperature of the cooling water for the engine ordinarily increased up to 80° C. In the configuration shown in FIG. 6B, a cooler is provided as the temperature adjusting device 12, and the pipe 25 for the refrigeration medium cooled by the cooler and the fuel pipe 15 are integrated as a single structure. Owing to this structure, there is such an advantage as the temperature control of the fuel pipe 15 can be established precisely. In the configuration shown in FIG. 6C, a cooler is provided as the temperature adjusting device 12, and the air is used as the refrigeration medium and is led between the heat insulation material 16 and the fuel pipe 15. As the heat content of the air is smaller than that of the liquidized refrigeration medium and thus the heat exchange at the heat pipe 15 and the temperature adjusting device 12 can be established efficiently, there is such an advantage as this configuration can provide more precise and quick response rather than those of FIGS. 6A and 6B.

According to the first embodiment of the present invention, it will be appreciated that, in case of using the low boiling point fuel, the fuel vaporization and leakage in the fuel tank 3 and the fuel pipe 15 can be detected precisely and their affect can be reduced or removed. In this embodiment, it is apparent from the above description that the fuel supply apparatus can be established even by the control only with the feed pump 6 in the fuel tank 3 and without configured components such as the temperature adjusting device 12, the radiator 24 and the heat insulation material 16, in which the control accuracy and its application range may be sacrificed.

Figure 7:
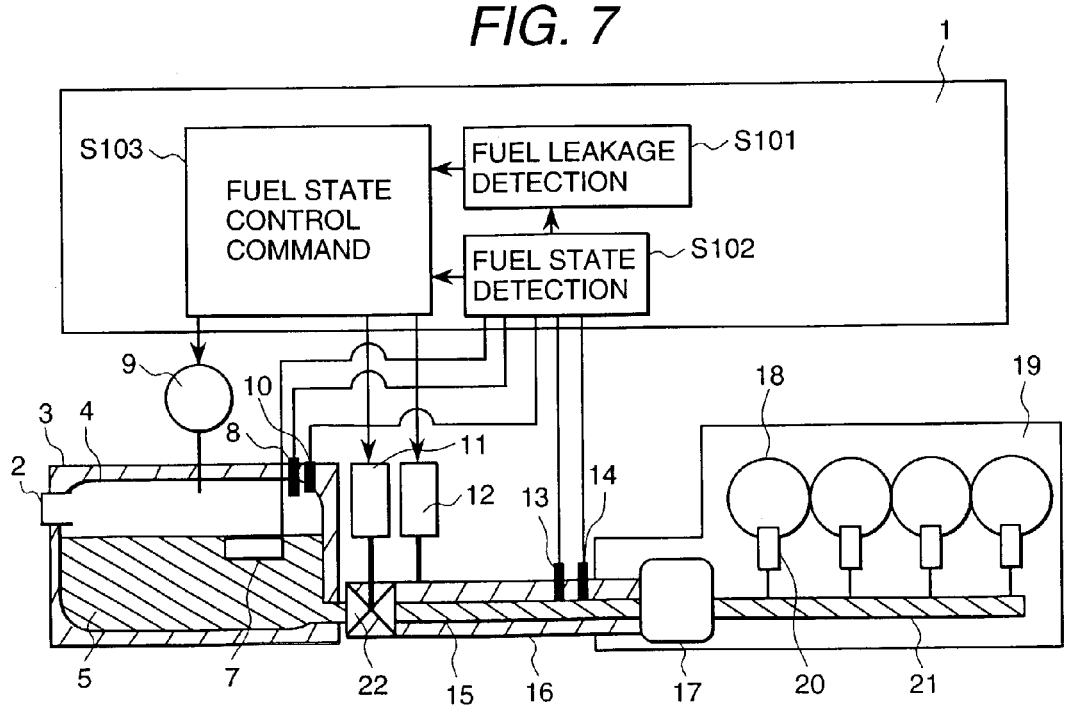
FIG. 7 is a structure of the fuel supply apparatus and its control diagram in the second embodiment of the present invention.

FIG. 7 illustrates the configuration of the fuel supplying apparatus and its control flow diagram schematically in the second embodiment of the present invention. The configuration of this embodiment is characterized by that the pressure control device 9 is used in the fuel tank as the fuel conveying means instead of the feed pup shown in the first embodiment. This pressure control device 9 maintains the internal pressure of the fuel tank 3 to be higher than the atmospheric pressure (preferably 5 kgf/cm2 or larger) as well as enables to convey the fuel, which establishes a low cost system. The basic structure except this feature is identical to the structure in the first embodiment. The method for controlling the fuel state in this embodiment is described below by referring to FIGS. 8 to 11.

Figure 8:
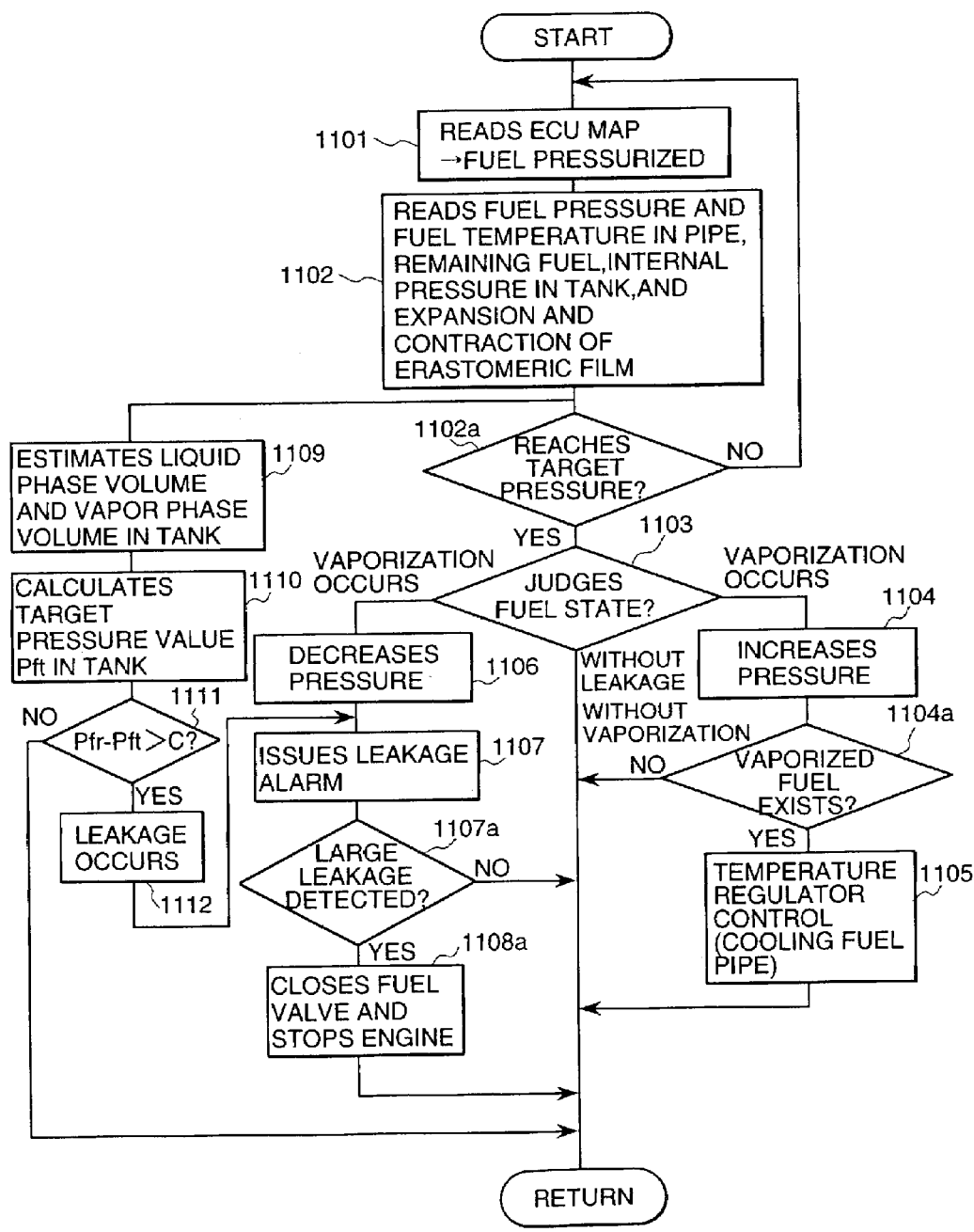
FIG. 8 is a flowchart for controlling the fuel state in the operation of the engine in the second embodiment of the present invention.

FIG. 8 shows an flow chart for controlling the fuel state in the second embodiment of the present invention in which the engine 19 (an internal combustion engine in this embodiment) is in operation. In FIG. 8, when the engine is in operation, the fuel 5 is fed with a designated pressure (preferably 5 kgf/cm2 or larger) by using the pressure control device 9 (Block 1101). This feed pressure is selected from the target feed pressure values predefined in ECU1 in responsive to the operational condition, the ambient air condition and the output value from the fuel temperature sensor 14. Next, the fuel pressure and temperature in the fuel pipe 15 are detected by the fuel pressure sensor 13 and the fuel temperature sensor 14, and the output values from the fuel remaining volume sensor 7, the pressure sensor 8 the elastomatic film expansion sensor 10 are read in as the information on the state inside the fuel tank 4 (Block 1102). At this step, by comparing the target pressure value of the pressure control device 9 with the output value from the fuel pressure sensor in the fuel pipe 15, the feed back control is performed so that the output value from the pressure control device 9 may become the target feed pressure value. Next, the fuel state is judged (Block 1103), and then the target pressure value is increased when the vaporized fuel exists (Block 1104). In case that there exists a vaporized fuel yet after increasing the target pressure, the fuel pipe 15 is made cooled by operating the temperature adjusting device 12 (Block 1105). In case that the fuel leakage is detected in the result of Block 1103, the pressure of the pressure control device 9 is decreased (Block 1106), and in case that the engine 19 is loaded in the vehicle, the fixed power generator or the fixed compression refrigerating machine, the warning sound or light is issued to the user of the vehicle (Block 1107). In case that the fuel leakage volume is large or that the fuel leakage volume is a given value or larger even after decreasing the feed pump pressure, the operation of the engine is terminated by shutting down the fuel supply by closing the electromagnetic valve 22 after issuing the warning signal to the user (Block 1108). In case that the engine 19 is used in a vehicle and its system is configured like a hybrid automotive in which the drive system is driven by the motor as well as the engine 19, it is allowed to operate the drive system with the motor while the fuel supply to the engine 19 is suspended. As for the fuel state in the fuel tank 3, comparing the output value Pft (the instruction value Pft) by the pressure control device 9 with the output value Pfr from the pressure sensor 8 (Block 1109), if the difference between two values, Pft–Pfr, is a given value or larger, it is judged that the actual gaseous phase volume is smaller than the estimated gaseous phase volume, that is, the fuel leakage may occur (Block 1112) and then Block 1107 is selected next and consecutive control operations are performed. In Block 1007, the fuel leakage locations are warned in association with the locations inside the fuel tank 3 or inside the fuel pipe 15, respectively. In view of protecting the elastomatic film 4, the range of the pressure applied by the pressure control device 9 is controlled so that the output value of the expansion sensor may be below a given value.

Figure 9:
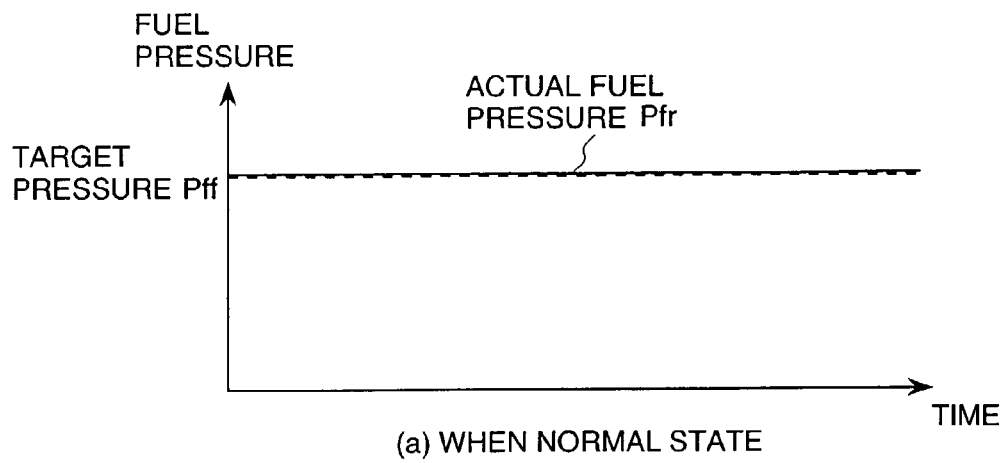
FIG. 9 is a relationship between the target feed pressure value and the output value from the fuel pressure sensor in the second embodiment of the present invention.
Figure 9:
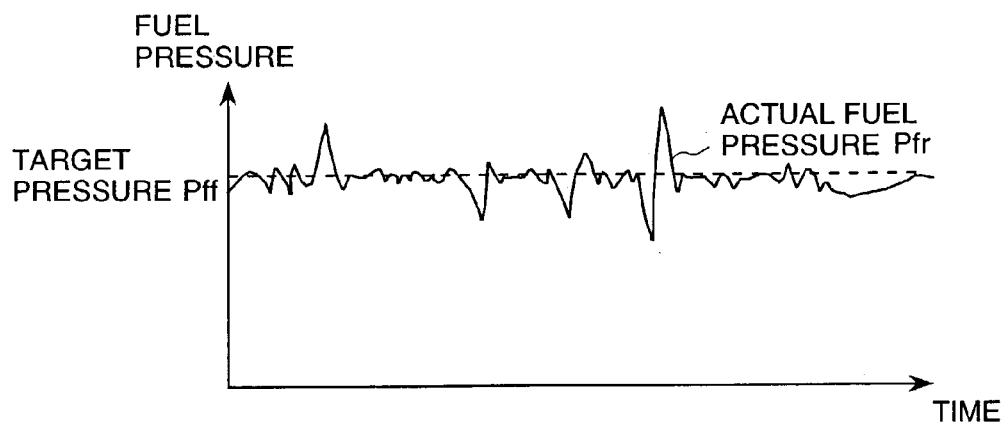
Figure 9:
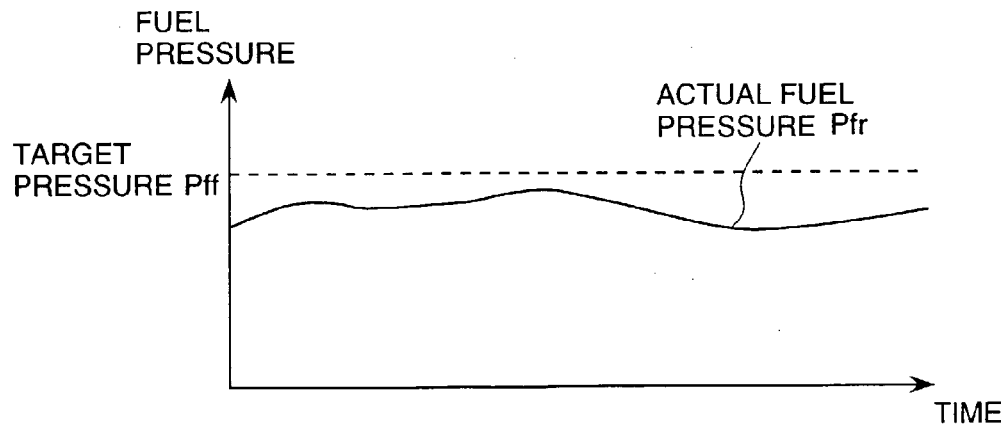

FIG. 9 shows the relationship between the target pressure value and the output value from the fuel pressure sensor. As shown in FIG. 9, the output value from the fuel pressure sensor in relation to the target pressure value varies for the cases including (a) when normal operation (with nothing peculiar), (b) when vaporized fuels exist in the pipe and (c) when fuel leakage occurs. In case of (a) normal operation, that is, there is no abnormal state found in the fuel supply system, the target pressure value becomes almost identical to the actual fuel pressure sensed value, but in contrast, in case of (b) vaporized fuels existing, the actual fuel pressure value changes in the time domain, and in case of (c) fuel leakage, the actual fuel pressure value does not exceed the target pressure value. By observing this relationship, it will be appreciated that the fuel state can be judged accurately, and that the influence by the fuel vaporization and the fuel leakage in the fuel pipe 15 can be reduced or removed.

Figure 10:
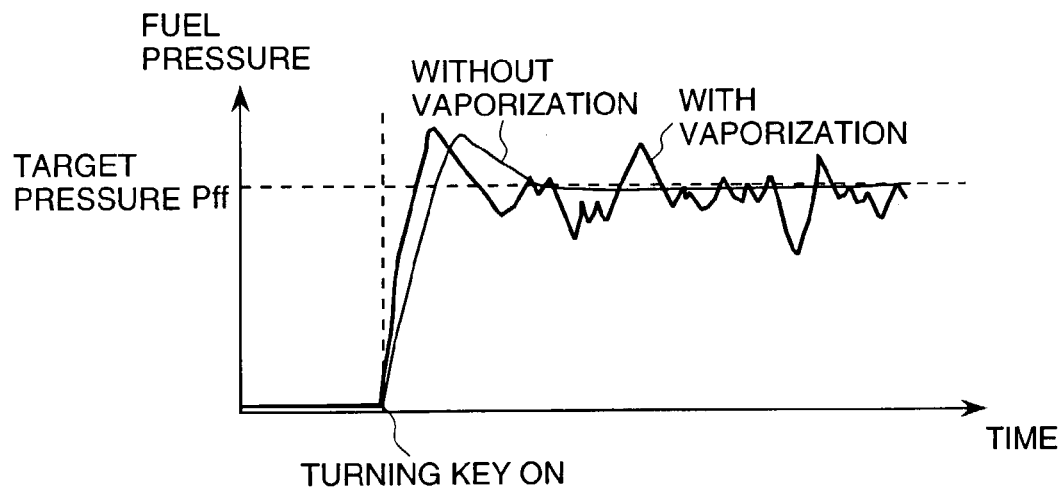
FIG. 10 is a relationship between the target feed pressure value and the output value from the fuel pressure sensor in the start-up operation of the engine in the second embodiment of the present invention.

FIG. 10 shows the relationship between the target pressure value and the output value from the fuel pressure when the engine starts. When the key is turned on in order to start the engine 19, the feed pump is operated and the fuel pressure rises up. According to this figure, it is proved that the transient characteristic in the rise-up of the fuel pressure changes dependent of the existence of the vaporized areas in the fuel pipe 15.

Figure 11:
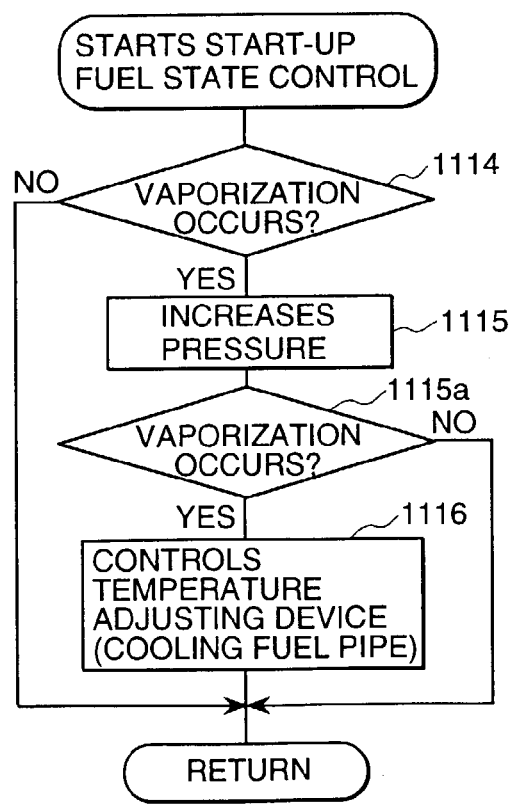
FIG. 11 is a flowchart for controlling the start-up operation in the second embodiment of the present invention.

FIG. 11 shows a control flow chart when the engine starts. If it is judged that the vaporized area exists in the fuel pipe 15 by referring to the transient characteristic in the rise-up of the fuel pressure shown in FIG. 10 (Block 1114), the target pressure of the pressure control device 9 is increased (Block 1115). In case that the vaporized fuel exists yet after increasing the target pressure, the fuel pipe 15 is cooled by operating the temperature adjusting device 12 (Block 1116).

According to the second embodiment of the present invention, it will be appreciated that, in case of using the low boiling point fuel, the fuel vaporization and fuel leakage in the fuel tank 3 and the fuel pipe 15 can be detected precisely and their affect can be reduced or removed. In this embodiment, the fuel supply apparatus can be established even by the control only with the feed pump 6 in the fuel tank 3 and without configured components such as the temperature adjusting device 12, the radiator 24 and the heat insulation material 16, in which the control accuracy and its application range may be sacrificed.

The apparatus with an internal combustion engine loaded includes a vehicle, a fixed electric generator and a fixed compression refrigerating machine.

It is also more effective by combining with structural improvement in the fuel tank and the fuel pipe in order to prevent the vaporization and leakage.

The embodiments in the present invention can be summarized as follows.

(Embodiment 1)
The fuel state control means control the voltage of said fuel conveying means in responsive to the detection results of said fuel state detecting means and said fuel leakage detecting means.

(Embodiment 2)
In the Embodiment 1, the fuel leakage protecting means is provided inside said fuel storing means.

(Embodiment 3)
In the Embodiment 2, the fuel leakage protecting means is made with an elastomatic material having an expandable mechanical characteristic, and stores said low boiling point fuel inside the elastomatic container.

(Embodiment 4)
In the Embodiment 2 or 3, the fuel leakage protecting means is made with an elastomatic material having an expandable mechanical characteristic, and changes the volume inside said elastomatic container in responsive to the detection results of said fuel state detecting means and said fuel leakage detecting means.

(Embodiment 5)
In the Embodiment 1 to 4, said fuel state controlling means is provided outside said fuel pipe.

(Embodiment 6)
In the Embodiment 5, said fuel state controlling means is a temperature adjusting device attached to said fuel pipe.

(Embodiment 7)
In the Embodiment 6, said fuel state controlling means is a refrigeration medium passing through said fuel pipe.

(Embodiment 8)
In the Embodiment 7, the temperature of said refrigeration medium is controlled by said temperature adjusting device.

(Embodiment 9)
In the Embodiment 7 or 8, said refrigeration medium is water and passes in the radiator for the cooling water of said internal combustion engine through said pipe attached to said fuel pipe.

(Embodiment 10)
In the Embodiments 1 to 9, said fuel leakage detecting means is preferably composed of at least one of a fuel pressure sensor provided in said fuel pipe, a pressure sensor provided in said fuel storing means, a fuel temperature sensor provided at said fuel pipe or said fuel storing means, a fuel remaining sensor for detecting the remaining volume of said low boiling point fuel in the said storing means, a volume detecting sensor for detecting the volume of the elasticated container provided in said fuel storing means and said fuel conveying means, and estimates the fuel leakage amount according to the output signals from the individual sensors and means and their calculation result.

(Embodiment 11)
In the Embodiments 1 to 10, said fuel leakage detecting means is preferably composed of at leas one of a fuel pressure sensor provided in said fuel pipe, a pressure sensor provided in said fuel storing means, a fuel temperature sensor provided at said fuel pipe or said fuel storing means, a fuel remaining sensor for detecting the remaining volume of said low boiling point fuel in said fuel storing means, a volume detecting sensor for detecting the volume of the elasticated container provided in said fuel storing means and said fuel conveying means, and estimates the fuel leakage location according to the output signals from the individual sensors and means and their calculation result.

(Embodiment 12)

In the Embodiment 11, in case that the estimated value of the fuel leakage volume is a given value or larger, the operation of said internal combustion engine is terminated.

(Embodiment 13)

In the Embodiment 11, a fuel leakage warning means is provided for signaling at least one of the alarm sound or the alarm lamp to the user of the apparatus with said internal combustion engine loaded in case that the estimated value for the fuel leakage amount is a designated value or larger.

(Embodiment 14)

In the Embodiments 1 to 11, a fuel supply apparatus described in the claim 14 having a fuel leakage location alarming means is provided.

(Embodiment 15)

In case that at least one means of the fuel storing means for storing said low boiling point fuel; the system includes the fuel conveying means for conveying said low boiling point fuel from said fuel storing means to the engine; the fuel pipe for leading said low boiling point fuel to be conveyed from said fuel storing means to said internal combustion engine; the fuel leakage protecting means for preventing the leakage of said low boiling point fuel in said fuel storing means or in said fuel pipe; the fuel leakage detecting means for detecting the leakage of said low boiling point fuel in said fuel storing means or in said fuel pipe; the fuel state detecting means for detecting the fuel state in said fuel storing means or in said fuel pipe; and the fuel state controlling means for controlling the fuel state in said fuel storing means or in said fuel pipe is defected, the operation of said internal combustion engine is terminated.

(Embodiment 16)

In case that at least one means of the fuel storing means for storing said low boiling point fuel; the system includes the fuel conveying means for conveying said low boiling point fuel from said fuel storing means to the engine; the fuel pipe for leading said low boiling point fuel to be conveyed from said fuel storing means to said internal combustion engine; the fuel leakage protecting means for preventing the leakage of said low boiling point fuel in said fuel storing means or in said fuel pipe; the fuel leakage detecting means for detecting the leakage of said low boiling point fuel in said fuel storing means or in said fuel pipe; the fuel state detecting means for detecting the fuel state in said fuel storing means or in said fuel pipe; and the fuel state controlling means for controlling the fuel state in said fuel storing means or in said fuel pipe is defected, the fuel leakage alarming means is provided for signaling at least one of the alarm sound or the alarm lamp to the user of the apparatus with said internal combustion engine loaded.

(Embodiment 17)

In case that at least one means of the fuel storing means for storing said low boiling point fuel; the system includes the fuel conveying means for conveying said low boiling point fuel from said fuel storing means to the engine; the fuel pipe for leading said low boiling point fuel to be conveyed from said fuel storing means to said internal combustion engine; the fuel leakage protecting means for preventing the leakage of said low boiling point fuel in said fuel storing means or in said fuel pipe; the fuel leakage detecting means for detecting the leakage of said low boiling point fuel in said fuel storing means or in said fuel pipe; the fuel state detecting means for detecting the fuel state in said fuel storing means or in said fuel pipe; and the fuel state controlling means for controlling the fuel state in said fuel storing means or in said fuel pipe is defected, the fuel system fault location alarming means is provided for estimating which means is fault and reporting its estimation result to the user of the apparatus with said internal combustion engine loaded.

According to the above described embodiments, the following structures can be provided.

A fuel supply apparatus using a low boiling point fuel, comprising a control apparatus generating an electric signal in responsive to at least either of the fuel leakage volume or the fuel vaporization state; and a adjusting apparatus for adjusting at least either of the fuel pressure or the fuel temperature in responsive to the output signal from said control apparatus.

A fuel supply apparatus using a low boiling point fuel, comprising a first fuel pressure sensor detecting the fuel pressure in the fuel storing container;

a second fuel pressure sensor detecting the fuel pressure in the fuel pipe leading the fuel from said fuel storing container to the engine; and a fuel flow rate adjusting apparatus for adjusting at least one of said fuel pressure or fuel temperature when the output signals from both pressure sensors reaches a specified condition.

A fuel supply apparatus using a low boiling point fuel, comprising a pressure sensor detecting the fuel pressure in the fuel pipe leading the fuel from said fuel storing container to the engine;

a temperature sensor detecting the fuel temperature in the fuel pipe leading the fuel from said fuel storing container to the engine; and a fuel flow rate adjusting apparatus for adjusting the fuel flow rate in said fuel pipe when the output signals from both sensors reaches a specified condition.

A method for controlling a fuel supply apparatus for supplying a low boiling point fuel having a vapor phase at the normal temperatures and the atmospheric pressures, wherein said fuel supply apparatus comprises a fuel storing means for storing the low boiling point fuel;

a fuel conveying means for conveying the low boiling point fuel from the fuel storing means;

a fuel pipe for leading the low boiling point fuel to be conveyed from the fuel storing means;

a fuel leakage protecting means for preventing the leakage of the low boiling point fuel in the fuel storing means or in the fuel pipe;

a fuel leakage detecting means for detecting the fuel leakage in the fuel storing means or in the fuel pipe;

a fuel state detecting means for detecting the fuel state in the fuel storing means or in the fuel pipe; and a fuel state controlling means for controlling the fuel state in the fuel storing means or in the fuel pipe, in which at least one of the states in the fuel storing means, the fuel conveying means, and at least one state of the fuel storing means, the fuel conveying means, the fuel pipe and the fuel leakage protecting is controlled by using the fuel state controlling means in responsive to the detection result by the fuel state detecting means and the fuel leakage detecting means.

More specifically and preferably, in the above described fuel supply apparatus, the fuel state controlling means controls at least one of the temperature, the pressure and the shape in the fuel storing means, the fuel pipe and the fuel leakage protecting means in responsive to the detection result by the fuel state detecting means and the fuel leakage detecting means.

The fuel supply apparatus of the present invention enables to reduce the fuel evaporation and the fuel leakage by controlling the fuel state in responsive to the fuel vaporization and fuel leakage state in the fuel storing container and in the fuel pipe in case of using a low boiling point fuel having a vapor phase in the normal temperatures and atmospheric pressures.

What is claimed is:

1. A fuel supply apparatus using a low boiling point fuel comprising
   a fuel storing container; and
   another container made of elastomatic material having an expandable mechanical characteristic inside said fuel storing container, wherein a feed pump is provided inside said another container made of elastomatic material.

2. A fuel supply apparatus using a low boiling point fuel comprising
   a fuel storing container; and
   another container made of elastomatic material having an expandable mechanical characteristic inside said fuel storing container comprising:
   a fuel pipe leading a low boiling point fuel stored in said fuel storing container; and
   a temperature adjusting device for heating or cooling said fuel pipe.

3. A fuel supply apparatus using a low boiling point fuel of claim 2, wherein said fuel pipe is covered by an insulation material.

4. A fuel supply apparatus using a low boiling point fuel of claim 2, wherein said fuel pipe and a flow route member for flowing a refrigeration medium for heating or cooling said fuel pipe are placed so as to be close to each other, and both are covered by an insulation material.

5. A fuel supply apparatus using a low boiling point fuel comprising
   a fuel storing container; and
   another container made of elastomatic material having an expandable mechanical characteristic inside said fuel storing container;
   a fuel pipe for leading a low boiling point fuel stored in a fuel storing container to an engine; and
   a flow rate controlling apparatus for adjusting the flow rate of the fuel in the fuel pipe.

6. A fuel supply apparatus using a low boiling point fuel of claim 5, wherein a drive signal of the flow rate controlling apparatus is at least a function of either pressure of the fuel or temperature of the fuel.

7. A fuel supply apparatus using a low boiling point fuel of claim 6, wherein either the pressure of the fuel or the temperature of the fuel is at least a function of either leakage amount of the fuel or evaporation state of the fuel.

* * * * *